(12) United States Patent
Nevoux et al.

(10) Patent No.: US 6,473,626 B1
(45) Date of Patent: Oct. 29, 2002

(54) TELECOMMUNICATIONS NETWORK WITH FIXED AND MOBILE SUBSCRIBERS

(75) Inventors: Rola Nevoux, Elancourt (FR); Bruno Chatras, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/423,473
(22) PCT Filed: May 6, 1998
(86) PCT No.: PCT/FR98/00910
§ 371 (c)(1), (2), (4) Date: Jan. 14, 2000
(87) PCT Pub. No.: WO98/51105
PCT Pub. Date: Nov. 12, 1998

(30) Foreign Application Priority Data

May 7, 1997 (FR) .......................................... 97 05666

(51) Int. Cl.[7] .............................................. H04B 1/38
(52) U.S. Cl. .................... 455/560; 455/433; 455/426; 455/552
(58) Field of Search ................... 455/426, 422, 455/432, 433, 414, 413, 412, 445, 461, 560, 550, 552

(56) References Cited

U.S. PATENT DOCUMENTS

| | | | |
|---|---|---|---|
| 5,839,076 A | | 11/1998 | Becher |
| 5,924,030 A | * | 7/1999 | Rautiola et al. ............ 455/426 |
| 5,953,651 A | * | 9/1999 | Lu et al. .................... 455/445 |
| 6,301,474 B1 | * | 10/2001 | Hartmaier et al. .......... 455/417 |
| 6,324,402 B1 | * | 11/2001 | Waugh et al. .............. 455/445 |

FOREIGN PATENT DOCUMENTS

| | | |
|---|---|---|
| EP | 0 433 465 | 6/1991 |
| EP | 0 660 572 | 6/1995 |

OTHER PUBLICATIONS

French Search Report dated Sep. 7, 1998, PCT/FR98/00910.

* cited by examiner

*Primary Examiner*—Doris H. To
(74) *Attorney, Agent, or Firm*—Marshall Gerstein & Borun

(57) ABSTRACT

The telecommunications network has access switches and at least one nominal data base for mobile subscribers capable of accessing the network via several of the access switches. Each of the access switches has a table containing service data relating to fixed subscribers having terminals permanently connected thereto. The nominal data base contains, for each of the mobile subscribers, service data having the same nature as the service data relating to the fixed subscribers and mobility management data. The service data table of each access switch via which mobile subscribers can access the network receives, in addition to the service data relating to the fixed subscribers, service data relating to the mobile subscribers connected to the network via said access switch, which have been uploaded from the nominal data base during procedures to locate said mobile subscribers with the access switch.

1 Claim, 4 Drawing Sheets

TELECOMMUNICATIONS NETWORK WITH FIXED AND MOBILE SUBSCRIBERS

BACKGROUND OF THE INVENTION

The present invention relates to telecommunications networks designed to handle both fixed subscribers and mobile subscribers.

In current telecommunications networks, fixed subscribers are managed by so-called LE (Local Exchanges) which contain their service details and manage their physical access.

Mobile subscribers are managed by specific switches known as MSC (Mobile Switching Centres). Since these mobile subscribers do not have a static connection point like fixed subscribers, their service data are stored in nominal data bases. Within GSM and similar systems, these nominal data bases are called HLR (Home Location Registers). The MSC switches offer services to mobile subscribers on the basis of their service profiles. Some mobile switches have a local data base of visiting subscribers (VLR: Visitor Location Register), which contains copies of the nominal data base records relating to the mobile subscribers serviced. This architecture remains specific to mobile subscribers and does not allow fixed subscribers with no mobility requirement to be integrated.

An operator who wishes to have both types of subscriber (fixed and mobile) must have two dedicated infrastructures: one for fixed subscribers and the other for mobile subscribers, or develop a service logic for the fixed subscribers and a similar one for the mobile subscribers.

In practice, even if they are managed from a fixed network by means of an intelligent network (IN) architecture, the mobile subscribers are not integrated in the access switches (LE) and their service profiles are held instead in a nominal data base referred to as SDP (Service Data Point). The service logic used to manage mobility and offer these mobile subscribers the additional services are located in a SCP (Service Control Point), i.e. a platform of the intelligent network which controls and assists the switches of the fixed network in offering services intended for these mobile subscribers.

To date, hosting mobile subscribers on a fixed network infrastructure has entailed the need for specific redundant developments in order to take account of these new subscribers. For example, at the level of the SCP, it is necessary to duplicate a certain number of functions and services dedicated to the management of these subscribers.

A solution of this type is not integrated at all, i.e. it does not make use of existing functions and services in the infrastructure. Indeed, processing of the services is handled by the SCP, although there is an equivalent function for fixed subscribers in the LE.

SUMMARY OF THE INVENTION

EP-A-0 660 672 discloses a telecommunications network to which mobile terminals are likely to be connected via different switching systems. Different service profiles are associated with the mobile terminals in accordance with the switching system with which they are registered. In particular, the mobile terminal may be associated with a fixed terminal with which it shares a directory number. In the corresponding service profile, certain characteristics are associated with the mobile terminal only, and other ones are associated with the shared directory number. The system described in that document involves the management of several service profiles for a same terminal.

An object of the present invention is to define a solution that will enable mobile subscribers to be integrated in the LE for fixed subscribers and offer the same services and same network functions to both types of subscriber.

Accordingly, the invention proposes a telecommunications network comprising access switches, each of which has a table containing service data relating to fixed subscribers having terminals connected thereto on a permanent basis and at least one nominal data base for mobile subscribers, capable of accessing the network via a plurality of the access switches. For each of the mobile subscribers, the nominal data base contains service data of the same nature as the service data relating to fixed subscribers and mobility management data.

The service data table of each access switch, via which mobile subscribers can access the network, is arranged to receive, in addition to the service data relating to the fixed subscribers, service data relating to the mobile subscribers connected to the network via said access switch, which are uploaded from the nominal data base during procedures to locate said mobile subscribers with the access switch.

The service data relating to the mobile subscribers are contained in the same tables as those relating to fixed subscribers and managed by the same logics. From the user's point of view, this has the advantage of making the same services available, regardless of their nature (fixed or mobile) and/or regardless of what type of access is used (wire or radio). Furthermore, a network operator can optimise his developments by offering them to all types of subscriber (fixed or mobile) and all types of access (wire or radio).

DESCRIPTION OF PREFERRED EMBODIMENTS

Figure 1:
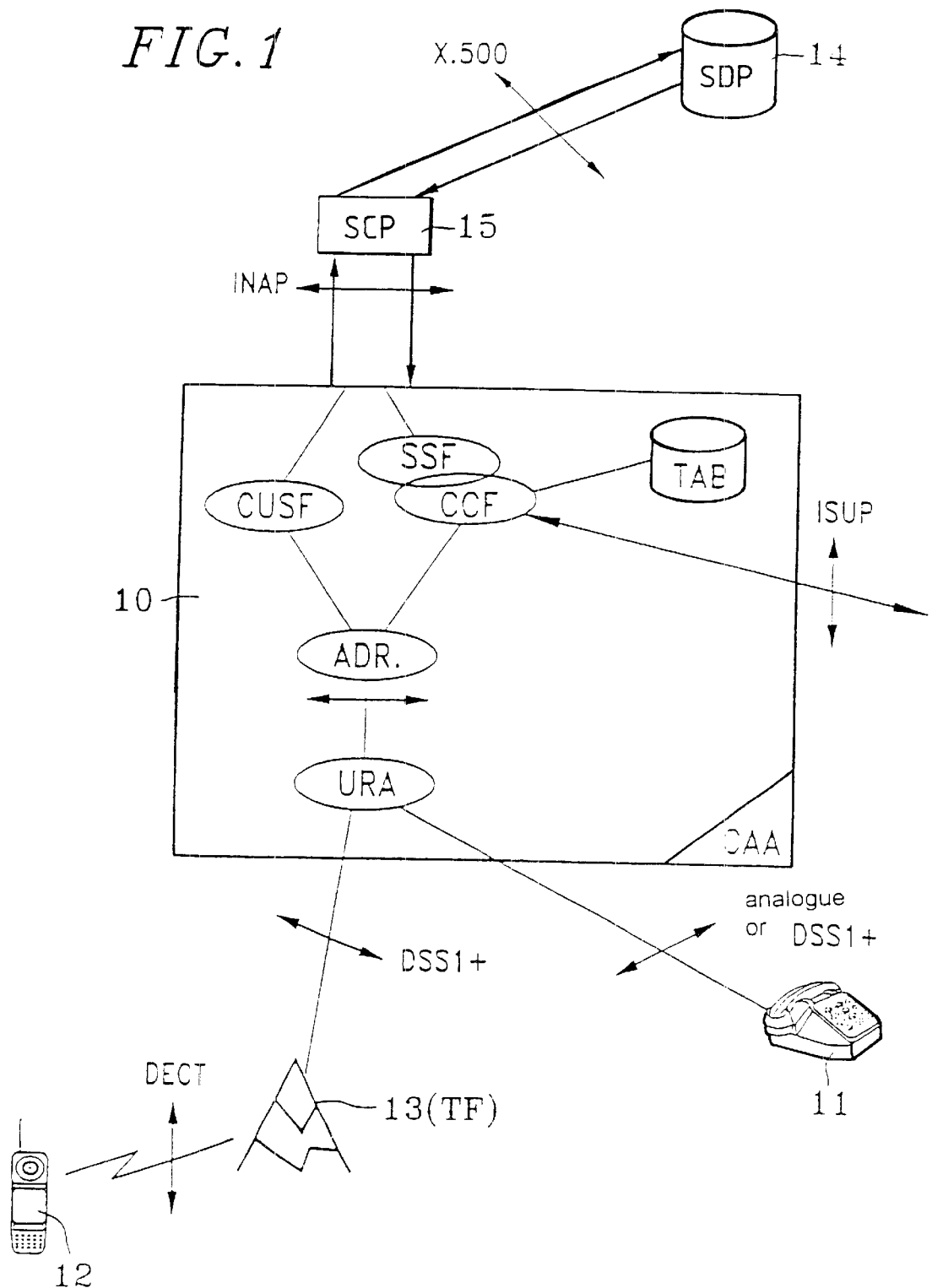
FIG. 1 is a diagram illustrating an example of a network architecture as proposed by the invention.

FIG. 1 illustrates an access switch 10 of a telecommunications network as proposed by the invention. This switch 10 is a local exchange LE for fixed subscribers. It is referred to here as "access switch" insofar as any call or service request concerning a fixed subscriber connected to it passes via this LE, which contains resources enabling the call or service request to be managed. Within the network, the different LE are inter-connected with one another and with transit switches.

In a conventional manner, the LE 10 has, amongst others, the following functions:

- a Call Control Function (CCF)
- a Service Switching Function (SSF)
- a Call Unrelated Service Function (CUSF), enabling dialogues unrelated to the call to be relayed between a user function and a function external to the CCF;
- a subscriber table TAB containing the service profiles of fixed subscribers;
- a function ADR for addressing the call and off-call transactions to subscriber connecting units (SCU) of the access network to which the equipment 11 of fixed subscribers is connected. This address is obtained via the Installation Designation. Number (or IDN) allocated to the installation of wire subscribers.

Let us look at the situation in which the network proposed by the invention supports the architecture of an intelligent network for the services supplied to subscribers. It should be noted that the functional entities CCF, SSF and CUSF mentioned above are those defined in Recommendation Q.1224 of the ITU-T.

Each fixed subscriber is declared in his LE by means of an installation designation number IDN which corresponds to his directory number, for example. He is allocated a service profile stored in the table TAB in connection with the IDN. This profile contains the rights to services to which the subscriber has signed up and the parameters used to perform these services. In order to process a call or a service request involving the terminal 11 of a fixed subscriber, the function CCF or CUSF looks up the table TAB to ascertain the subscriber's rights and obtain the parameters needed for processing. The processing in question may be performed either at the LE (this might be the case, for example, with services such as call restrictions, call forwarding, completion of call to busy subscriber, call screening . . . ), or at a Service Control Point (SCP) external to the LE (for example, free-phone services, credit card calling . . . ).

The network proposed by the invention, illustrated in FIG. 1, is also set up to manage mobile subscribers. Let us look at the situation in which these mobile subscribers are using portable terminals 12 to communicate with the network via fixed radio stations 13. However, it should be pointed out that a mobile subscriber could gain access via various types of wired or radio terminals, such as in the context of universal personal telecommunications (UPT).

Each radio station 13 of the network is connected to a subscriber connecting unit SCU of a LE, directly or via a concentrator. In addition to ports linked to wired installations 11, the SCU of the LE therefore have ports linked to fixed terminations (FT) of the radio network, each consisting of a station 13 (FIG. 1) or a concentrator.

The data which the network needs to store in order to manage the mobile subscribers are stored in one or more nominal data bases (SDP) 14. These data comprise:

service data of the same type as those stored in the tables TAB of the LE, enabling the same services to be offered to mobile subscribers as fixed subscribers;

mobility management data, which are processed in order to take account of the fact that the mobile subscriber is likely to be connected to the network by different LE and/or by different accesses of a same LE and in order to maintain the security of communications involving the mobile subscriber.

Processing of these mobility data may be integrated in the LE or, as in the example illustrated in FIG. 1, carried out elsewhere in an external SCP 15 capable of running a dialogue on the one hand with the SCP 14 and on the other with the functions SSF and CUSF of the LE.

During a procedure to locate a mobile subscriber at a LE 10, the service data specific to this subscriber are uploaded from the SDP 14 to the table TAB of the LE via the SCP 15. These data are then processed in exactly the same way as those relating to the fixed subscribers in order to perform the services. This presents a dual advantage. The users may have the benefit of the same services in all cases. From the viewpoint of the network operator, it is not necessary to provide two infrastructures or two redundant service logics in order to offer the same services to the different types of subscriber.

The mobile subscriber can be created in the tables of a LE in several forms. The choice of one form or another will depend on the subscriber management options offered by the LE and/or the type of connection. Irrespective of which variant is used, the mobile subscriber is always created as a fixed subscriber. Three variants, a, b and c, will be considered below by way of example:

a) For reach mobile subscriber, an entry with a IDN corresponding to his directory entry is created. The service profile of the subscriber is associated with this IDN. The IDN is associated with a number identifying a connecting port of the FT concerned. The type of identifier (logic port number, equipment number, . . . ) will depend on the connection mode. If the subscriber changes location area and therefore moves from one FT to another, the SCP 15 modifies the IDN/connection identifier association.

b) Each subscriber is created with a SDN (Secondary Designation Number) corresponding to his directory number, associated with the IDN corresponding to the relevant FT. The service profile of the subscriber is associated with the SDN and not with the IDN. When a subscriber moves from one FT to another, the SCP 15 modifies the SDN/IDN association.

c) Identical to variant b except that the IDN corresponds to a SCU. All the subscribers located under the FT connected to the same SCU are associated with the same IDN. This alternative assumes that there are intelligent functions in the SCU, which must know how to manage a subscriber number/FT relationship. If a subscriber moves from one FT to another connected to the same SCU, the SCU modifies this relationship. In the case a change from one SCU to another, the SCP modifies the SDN/IDN association.

There are several possible solutions for controlling the creation of a fixed subscriber in the LE (TAB):

by sending commands to the LE simulating the man/machine interface (MMI) used for operating requirements;

using the options of a Q3 type management interface (TMN);

or via a real time protocol on a semaphore network of the SS7 type, such as a protocol of the Remote Control type or a development of the INAP protocol (Intelligent Network Application part, standardized by the ITU-T in Recommendation Q.1228).

When a portable terminal 12 detects a new location area via the radio, it sends a location request to the FT via the radio interface. The FT transmits this request in turn to the LE via an off-call transaction without establishing a circuit. On receipt of this location request, the CUSF function of the LE recognises the "mobile" nature of the transaction, either on the basis of the access category listed in its tables if the mobile subscriber is associated therein the fixed termination or by a piece of information which the FT inserts in the protocol with each access. The CUSF function transmits each location request to the mobility management SCP 15. The SCP 15 identifies the mobile subscriber by retrieving his mobile identity, finds the address in the nominal SCP containing the service profile of the mobile subscriber and finds, via the SDP, the security data forming part of the mobility management data relating to the mobile subscriber in question. The mobility management logic 15 then proceeds to authenticate the mobile subscriber. If the authentication result is positive, the SCP 15 retrieves from the nominal SDP the service profile of the mobile subscriber as well as the address of the last LE at which this subscriber was located. The mobility management logic then proceeds to create an entry in the subscriber table (TAB) of the LE corresponding to the service profile of the subscriber in question, as outlined above.

The security data of the mobile subscriber may be brought as close as possible to the subscriber, e.g. in the SCP 15 where the mobility management logic is located, or may remain centralised at the SDP, in which case it will be accessed by the mobility management logic as and when needed.

The mobility service logic sends a data deletion request to the old LE (TAB) where this mobile subscriber was located and confirms the location update to the portable terminal 12.

FIGS. 1 to 4 illustrate different protocols which may be used between the entities of a network proposed by the invention although, clearly, this does not limit the scope of the invention in any respect:

DECT (Digital European Cordless Telephone, standardized by ETSI in the ETS 300 175 specifications) for the radio interface between the portable terminals 12 and the stations 13;

DSS1+ (ISDN protocol, standardized by the ITU-T in the Q.900 series of Recommendations and by ETSI) for the interface between the stations 13 and the SCU of the LE;

DSS1+, or conventional analog, for the interface between the SCU and the fixed terminals 11 or other wired installations;

ISUP (Integrated Services User Part, specified in the Q.700 series of Recommendations of the ITU-T) for the links between the network switches;

INAP for exchanges between the SSF or CUSF functions and the mobility management SCP 15;

X.500 (another ITU-T protocol specified in Recommendation Q.1228) for the exchanges between the SCP 15 and the SDP 14.

Figure 2:
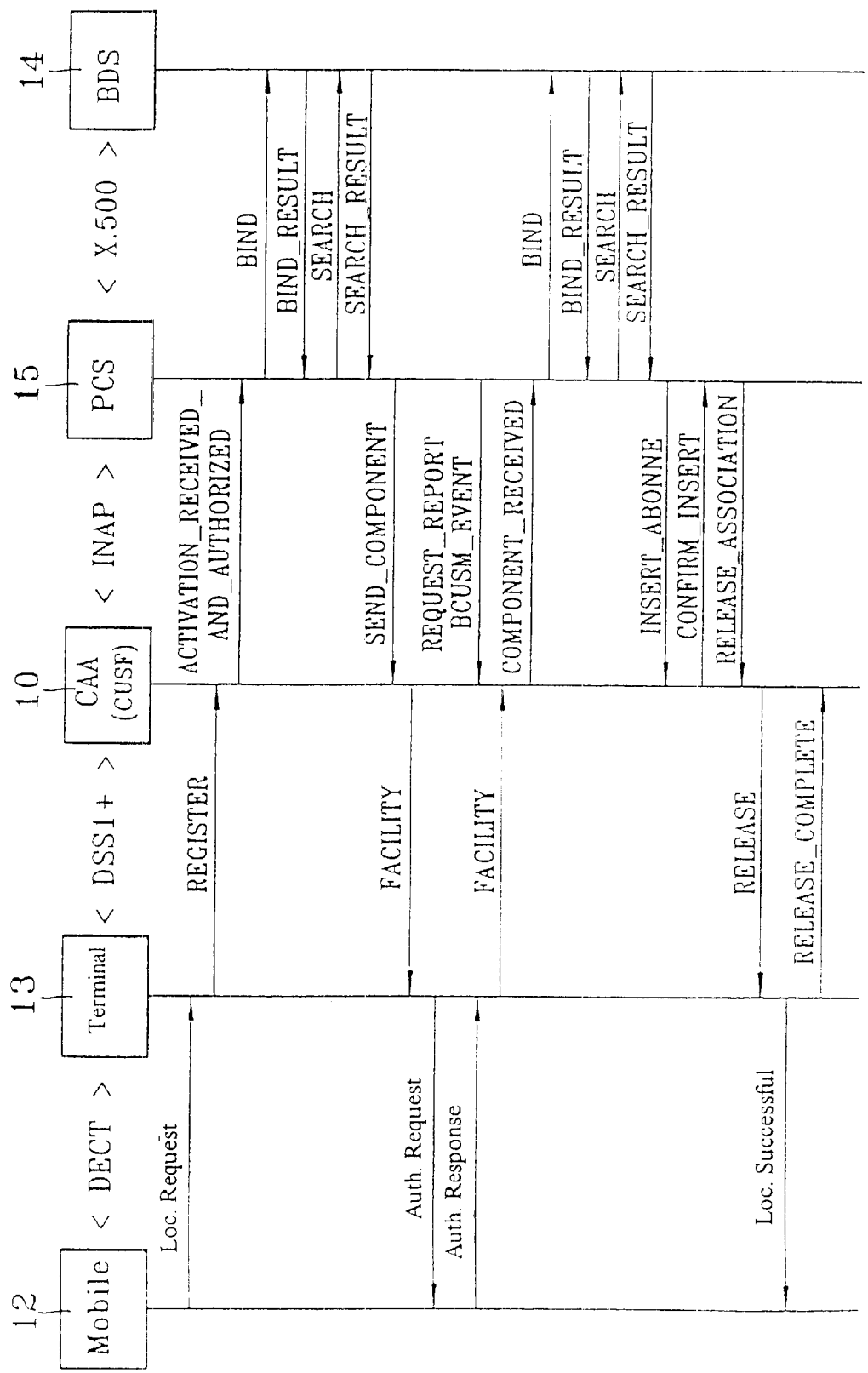
FIGS. 2, 3 and 4 are diagrams illustrating messages exchanged in a network such as that of FIG. 1 during a procedure to locate a mobile subscriber, when a call is initiated by a mobile subscriber and when a call to a mobile subscriber is being established.
Figure 3:
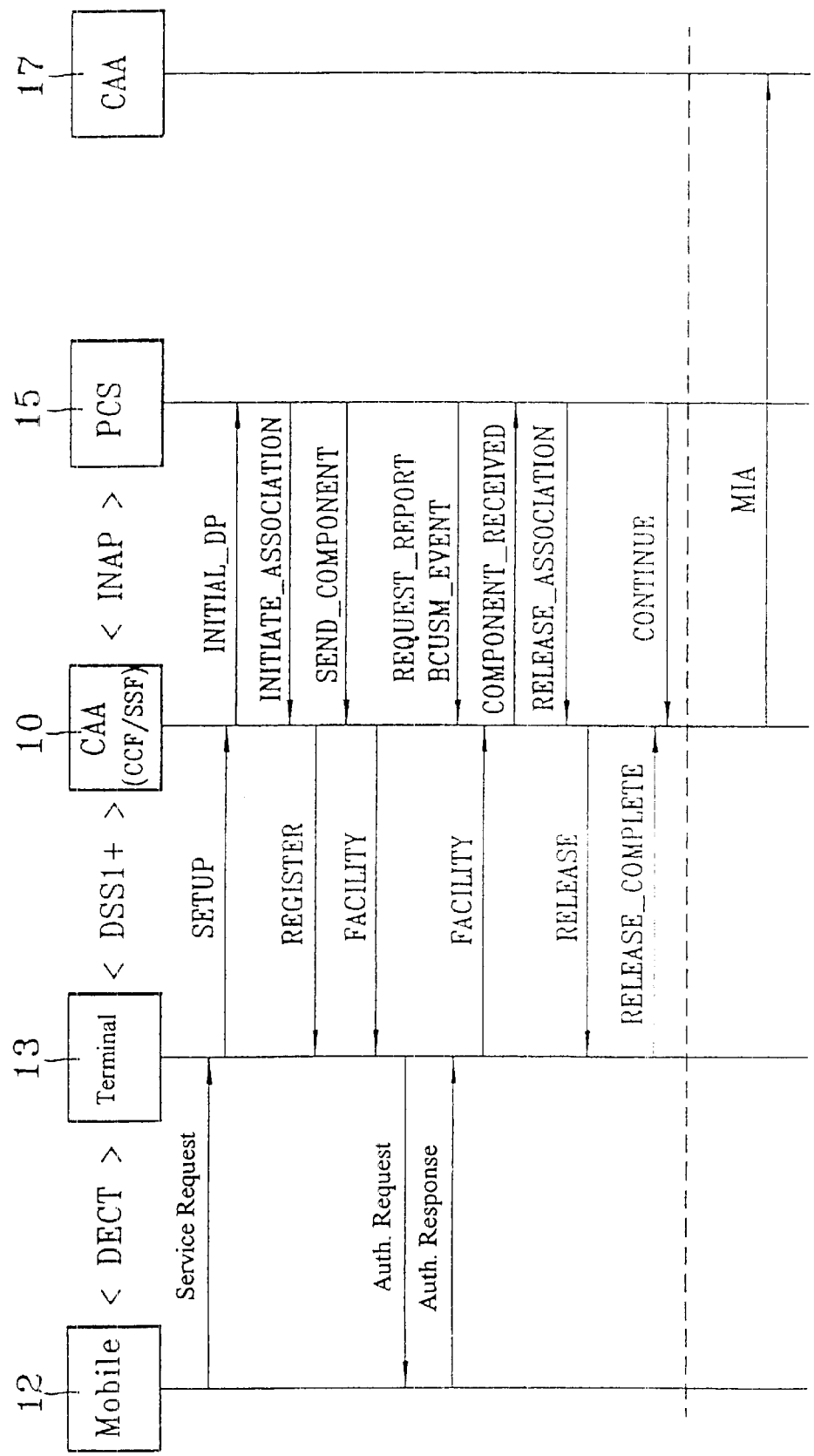
Figure 4:
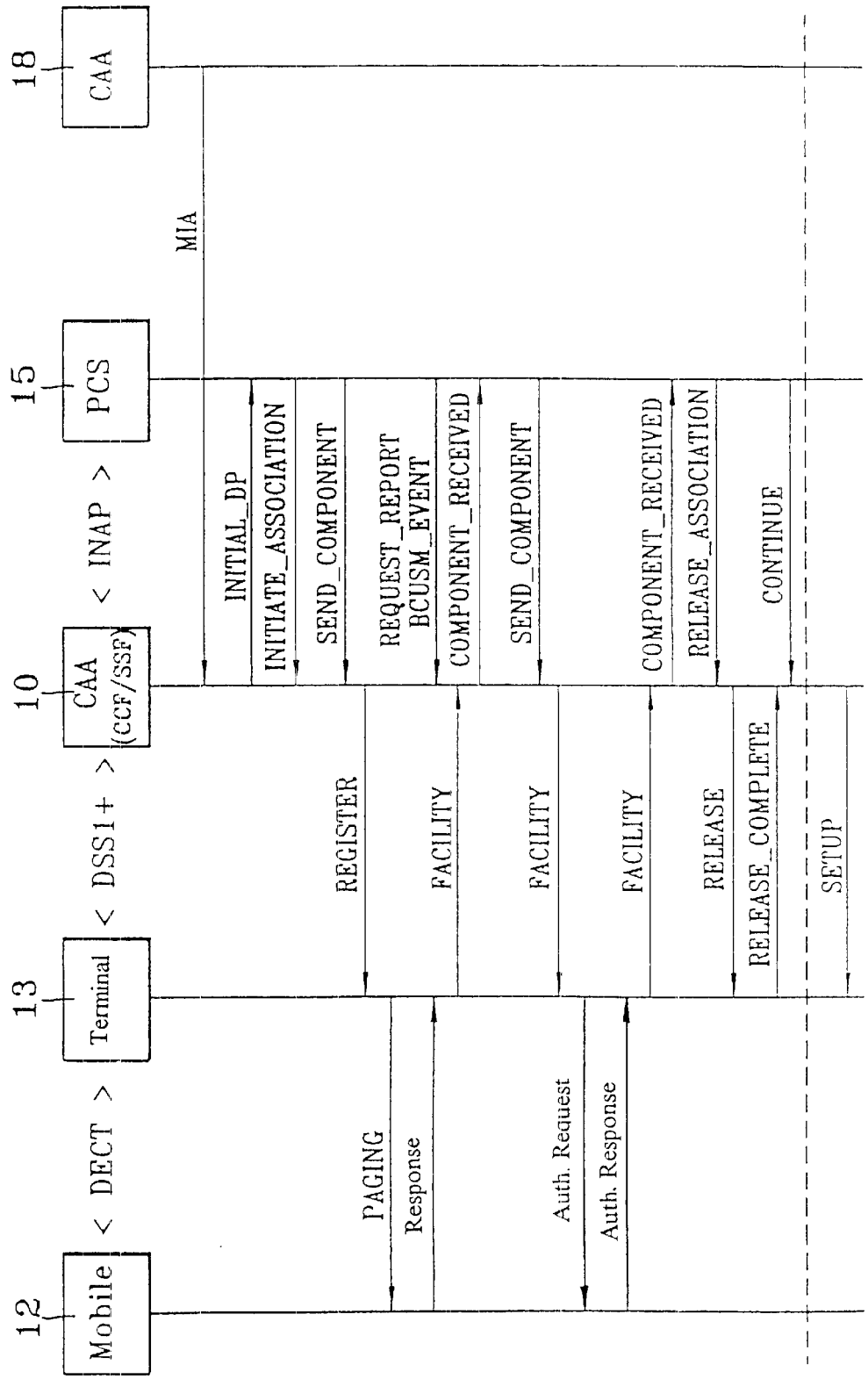

In this example, the procedure to locate a mobile subscriber may be run as illustrated in FIG. 2.

When the mobile terminal 12 of the subscriber detects that it must change location area, it issues a corresponding request to the station 13, which relays it to the SCP 15 via the CUSF function of the LE 10 (REGISTER message of the DSS1+ protocol and ACTIVATION$_{13}$ RECEIVED_AND_ AUTHORIZED message of the INAP protocol). An X.500 transaction (BIND, BIND_RESULT, SEARCH, SEARCH_RESULT messages) takes place between the SDP 14 and the SCP so that the latter retrieves the security data of the subscriber. The SCP 15 can then proceed with a request to authenticate the subscriber according to the authentication algorithm used in the network. This authentication request is transmitted in a SEND_COMPONENT message to the LE, which transmits it to the station 13 by means of a FACILITY message of the DSS1+ protocol. The response of the mobile to the authentication is returned via the station 13 in another FACILITY message and then to the SCP 15 in a COMPONENT_RECEIVED message of the INAP protocol. The SCP 15 checks that the mobile subscriber has been correctly authenticated, then proceeds with a new transaction with the SDP 14 to obtain the service profile of the subscriber. The SCP 15 then sends an INSERT_SUBSCRIBER message to the LE 10 in order to transmit the subscriber's service profile. The service data of this profile are written by the LE to its table TAB as if the subscriber were fixed. The LE returns a CONFIRM_ INSERT message to the SCP 15, after which the SCP terminates its processing by causing the subscriber's service profile to be deleted from the table of its old serving LE, if necessary, by allocating and supplying to the SDP 14 a new roaming number for the mobile subscriber, and by returning a RELEASE_ASSOCIATION message to the new LE. The end of the location update is indicated to the mobile terminal 12 via the DSS1+ and DECT interfaces.

In order to make an outgoing call (FIG. 3), or request another service, the mobile terminal 12 issues a service request message on the radio interface, which the station 13 and the functions CCF and SSF of the LE 10 relay to the mobility management SCP 15 by means of a SETUP message of the DSS1+ protocol and INITIAL_DP message of the INAP protocol. As in the case of the location procedure, the fact that the service request originates from a mobile subscriber is detected by the LE on the basis of either the identity of the connection port or a specific piece of information inserted in the DSS1+ protocol. The SCP 15 proceeds with authenticating the mobile terminal 12 in the same way as above and then withdraws by transmitting a RELEASE_ASSOCIATION message of the INAP protocol to the SSF function of the LE 10 if the authentication is successful. A RELEASE message from the DSS1+ protocol is transmitted to the radio station 13 to indicate that it may go ahead with the call setup procedure. From the moment indicated by a broken line in FIG. 3, the call is managed by the LE 10 in the exactly same way as if it were from a fixed terminal (the LE 10 starts by transmitting an initial addressing message (IAM) on the ISUP interface to the LE 17 of the callee). If a specific service must be run, the CCF function may proceed with the detections and the corresponding actions with the aid of the mobile subscriber's service profile looked up in the table TAB as if the subscriber were fixed.

In the case of a call destined for a mobile subscriber, the LE of the caller, having recognized that the call is destined for a mobile (for example on the basis of a prefix or a particular indicator in the dialing), queries the mobility management SCP in order to ascertain the address of the visited LE. The SCP 15 obtains this address by querying the SDP 14 and returns it to the LE of the caller. The LE 18 of the caller then sends an initial addressing message (IAM) (FIG. 4) to the visited LE 10, containing the number of the mobile subscriber. The visited LE then sends an INITIAL_ DP message of the INAP protocol to the SCP 15, to which the SCP 15 responds by issuing a command to page the mobile subscriber in INITIATE_ASSOCIATION and SEND_COMPONENT messages. This paging command is routed to the mobile terminal 12 and, if the latter responds to it, the SCP 15 proceeds with authenticating the mobile terminal 12 in the same way as above and then withdraws by transmitting a RELEASE_ASSOCIATION message of the INAP protocol to the SSF function of the LE 10 if the authentication has been successful. From the moment indicated by a broken line in FIG. 4, the call is managed by the LE 10 in exactly the same way as if it were addressed to a fixed terminal (it starts by transmitting a SETUP message of the DSS1+ protocol to the station 13 with which the mobile subscriber was located). If processing the call involves looking up the mobile subscriber's details, the CCF function of the LE 10 queries the table TAB as if the subscriber were fixed.

What is claimed is:

1. A telecommunications network, comprising access switches and at least one nominal data base for mobile subscribers capable of accessing the network via a plurality of the access switches, wherein each of the access switches has a table containing service data relating to fixed subscribers having terminals permanently connected thereto, wherein the nominal data base contains, for each of the mobile subscribers, service data having a same nature as the service data relating to the fixed subscribers and mobility management data, and wherein the service data table of each access switch via which mobile subscribers can access the network is arranged to receive, in addition to the service data relating to the fixed subscribers, service data relating to the mobile subscribers connected to the network via said access switch, which have been uploaded from the nominal data base during procedures to locate said mobile subscribers with the access switch.

* * * * *